Patented Jan. 7, 1941

2,227,957

UNITED STATES PATENT OFFICE 2,227,957

SOFTENED RUBBER

Warren F. Busse, Akron, Ohio, assignor to The B. F. Goodrich Company, New York, N. Y., a corporation of New York No Drawing. Application January 9, 1936, Serial No. 58,359

2 Claims. (Cl. 260—761)

This invention relates to the processing of rubber and has as its chief object to break down or soften crude rubber; that is, to increase its plasticity so as to facilitate its admixture with vulcanizing and other ingredients, its manufacture into finished articles, and its solution when rubber cements are to be manufactured.

In accordance with this invention, rubber is treated with a small proportion of an unsubstituted hydrazone, preferably at an elevated temperature. The treated rubber becomes far more plastic than rubber similarly manipulated in the absence of the hydrazone.

The unsubstituted hydrazones which are used in the practice of this invention may be those derived from hydrazine (as distinguished from substituted hydrazines such as phenylhydrazine) reacted with an aldehyde or ketone such as acetaldehyde, butyraldehyde, benzaldehyde, furfural, aldol, crotonaldehyde, alpha-ethyl alpha-hexenaldehyde, cinnamaldehyde, acetone, methyl ethyl ketone, mesityl oxide, phorone, acetophenone, benzophenone, cyclohexanone, xylose, glucose, and the like, either in equimolecular or other proportions, hence including the symmetrically substituted azines and the osazones, all of which are included in the term "hydrazone" unless otherwise limited. They are preferably added to the rubber in small proportions, say from 0.2 to 2%, before or during the mastication or plasticizing of the rubber, and the rubber is preferably warmed or heated during or after the mixing although heating is not indispensable.

As a specific example of one embodiment of the invention 1% of cyclohexanone hydrazone is added to a batch of crude rubber in a small internal mixer at 240° F. The hydrazone had no apparent effect on the plasticity of the batch as it came out of the mixer, but on subsequent heating to 280° F. or higher, or even on standing at room temperature for a month or two, the rubber became extremely soft and plastic. When such softened rubber is mixed with pigments such as carbon black, the pigments are far more rapidly and effectively dispersed than when ordinary rubber is used.

It is to be understood that the invention is not limited to the conditions of this example, which is merely illustrative of one embodiment, but that other hydrazones such as bis cyclohexylidene azine, etc., may be substituted and that the manner of addition and the conditions under which they act on the rubber may be varied within wide limits without exceeding the scope of the invention. For example, they may be mixed into solid rubber, or applied to its surface, or they may be mixed into liquid forms of rubber such as solutions or dispersions of rubber including rubber latex. However, they are preferably added to the rubber in advance of other compounding ingredients, and especially before the addition of sulfur.

I claim:

1. A soft, plastic unvulcanized rubber which has been plasticized in the presence of bis cyclohexylidene azine.

2. The process of promoting the breakdown of rubber which comprises treating rubber with a small proportion of bis cyclohexylidene azine.

WARREN F. BUSSE.